United States Patent
Zhang et al.

(10) Patent No.: US 11,378,063 B2
(45) Date of Patent: Jul. 5, 2022

(54) SYSTEM AND METHOD FOR DETECTING TURBINE UNDERPERFORMANCE AND OPERATION ANOMALY

(71) Applicant: GENERAL ELECTRIC COMPANY, Schenectady, NY (US)

(72) Inventors: Zhanpan Zhang, Niskayuna, NY (US); Peter Alan Gregg, Niskayuna, NY (US); Jin Xia, Niskayuna, NY (US); John Mihok, Schenectady, NY (US); Guangliang Zhao, Latham, NY (US); Bouchra Bouqata, Andover, MA (US)

(73) Assignee: General Electric Company, Schenectady, NY (US)

( * ) Notice: Subject to any disclaimer, the term of this patent is extended or adjusted under 35 U.S.C. 154(b) by 320 days.

(21) Appl. No.: 16/797,593

(22) Filed: Feb. 21, 2020

(65) Prior Publication Data
US 2021/0262446 A1    Aug. 26, 2021

(51) Int. Cl.
*F03D 17/00* (2016.01)
*F03D 7/04* (2006.01)

(52) U.S. Cl.
CPC ............. *F03D 17/00* (2016.05); *F03D 7/046* (2013.01); *F05B 2220/704* (2013.01); *F05B 2270/1033* (2013.01); *F05B 2270/404* (2013.01); *F05B 2270/708* (2013.01); *F05B 2270/709* (2013.01)

(58) Field of Classification Search
CPC .... F03D 17/00; F03D 7/046; F05B 2220/704; F05B 2270/1033; F05B 2270/404; F05B 2270/708; F05B 2270/709
See application file for complete search history.

(56) References Cited

U.S. PATENT DOCUMENTS

| 6,687,596 B2 | 2/2004 | Humerickhouse et al. |
| 8,219,356 B2 | 7/2012 | Mihok et al. |

(Continued)

FOREIGN PATENT DOCUMENTS

| EP | 3343300 A1 | 7/2018 |
| WO | 2017/088877 A1 | 6/2017 |

(Continued)

OTHER PUBLICATIONS

EP Search Report, dated Jun. 28, 2021.
(Continued)

*Primary Examiner* — Ronald D Hartman, Jr.
(74) *Attorney, Agent, or Firm* — Dority & Manning, P.A.

(57) ABSTRACT

A method of correcting turbine underperformance includes calculating a power production curve using monitored data, detecting changes between the monitored data and a baseline power production curve, generating operability curves for paired operational variables from the monitored data, detecting changes between the operability curves and corresponding baseline operability curves, comparing the changes to a respective predetermined metric, and if the change exceeds the metric, providing feedback to a turbine control system identifying at least one of the paired operational variables for each paired variable in excess of the metric. A system and a non-transitory computer-readable medium are also disclosed.

20 Claims, 6 Drawing Sheets

(56) References Cited

U.S. PATENT DOCUMENTS

| | | | |
|---|---|---|---|
| 9,035,479 B1 * | 5/2015 | Gates | G06Q 50/06 290/43 |
| 9,379,951 B2 | 6/2016 | Mihnev | |
| 10,393,093 B2 * | 8/2019 | Gregg | F03D 7/028 |
| 11,119,131 B2 * | 9/2021 | Qian | G01R 31/40 |
| 2012/0271593 A1 | 10/2012 | Uluyol et al. | |
| 2014/0058615 A1 | 2/2014 | Hatch et al. | |
| 2015/0198144 A1 * | 7/2015 | Park | G06Q 50/10 290/44 |
| 2016/0033580 A1 * | 2/2016 | Qiao | G01R 31/343 324/765.01 |
| 2016/0084224 A1 * | 3/2016 | Tyber | F03D 17/00 700/287 |
| 2016/0356859 A1 | 12/2016 | Harding et al. | |
| 2017/0268484 A1 * | 9/2017 | Li | F03D 7/0204 |
| 2017/0352245 A1 | 12/2017 | Maher et al. | |
| 2018/0087489 A1 | 3/2018 | Chioua et al. | |
| 2018/0274520 A1 * | 9/2018 | Wang | F03D 17/00 |
| 2018/0335019 A1 * | 11/2018 | Knudsen | G01R 21/1331 |
| 2019/0138970 A1 | 5/2019 | Deutsch et al. | |
| 2019/0277257 A1 * | 9/2019 | Nielsen | F03D 17/00 |

FOREIGN PATENT DOCUMENTS

| | | |
|---|---|---|
| WO | 2018/157896 A1 | 9/2018 |
| WO | WO 2018/203891 A1 | 11/2018 |

OTHER PUBLICATIONS de Andrade Vieira, Rodrigo J. et al., "Power Curve Modelling of a Wind Turbine for Monitoring its Behaviour", 4th International Conference on Renewable Energy Research and Applications (ICRERA), Palermo, Italy, Nov. 22, 2015, (pp. 1052-1057, 6 total pages).

* cited by examiner

SYSTEM AND METHOD FOR DETECTING TURBINE UNDERPERFORMANCE AND OPERATION ANOMALY

BACKGROUND

Turbine underperformance is a large contributor to a turbine's energy production loss. Conventional approaches first analyze the turbine performance data manually, which can lead to results with large uncertainty. Then, the connection between energy underproduction and the turbine operation anomaly cannot be built automatically, which makes root cause identification difficult.

DESCRIPTION

Embodying systems and methods can detect underperformance of a wind turbine power generation station, and identify root causes of the underperformance by applying operating characteristic model(s) of the wind turbine. Embodiments provide automatic detection of the turbine's underperformance and its operational anomalies. This automatic detection avoids conventional manual processes of data analysis, reduces uncertainty, and identifies root cause(s) of the underperformance. Root causes on underperformance can include incorrect control parameters, blade misalignment, sub-optimal blade pitch control, etc.

In some implementations, after identifying the root cause(s), embodiments can generate actionable information from which a turbine's control system can adjust the turbine's operating parameters to increase its energy performance, and/or provide reports indicating component maintenance/replacement recommendations.

An embodying method can simultaneously be applied to the real-time turbine operational data for turbines co-located at a particular wind farm and/or across turbines at a fleet level. Implementation at a broad level can facilitate an asset performance management strategy and largely increase energy productivity across an enterprise's facilities. The ability to identify root causes enables more efficient maintenance planning and recovery from lost energy production.

Figure 1:
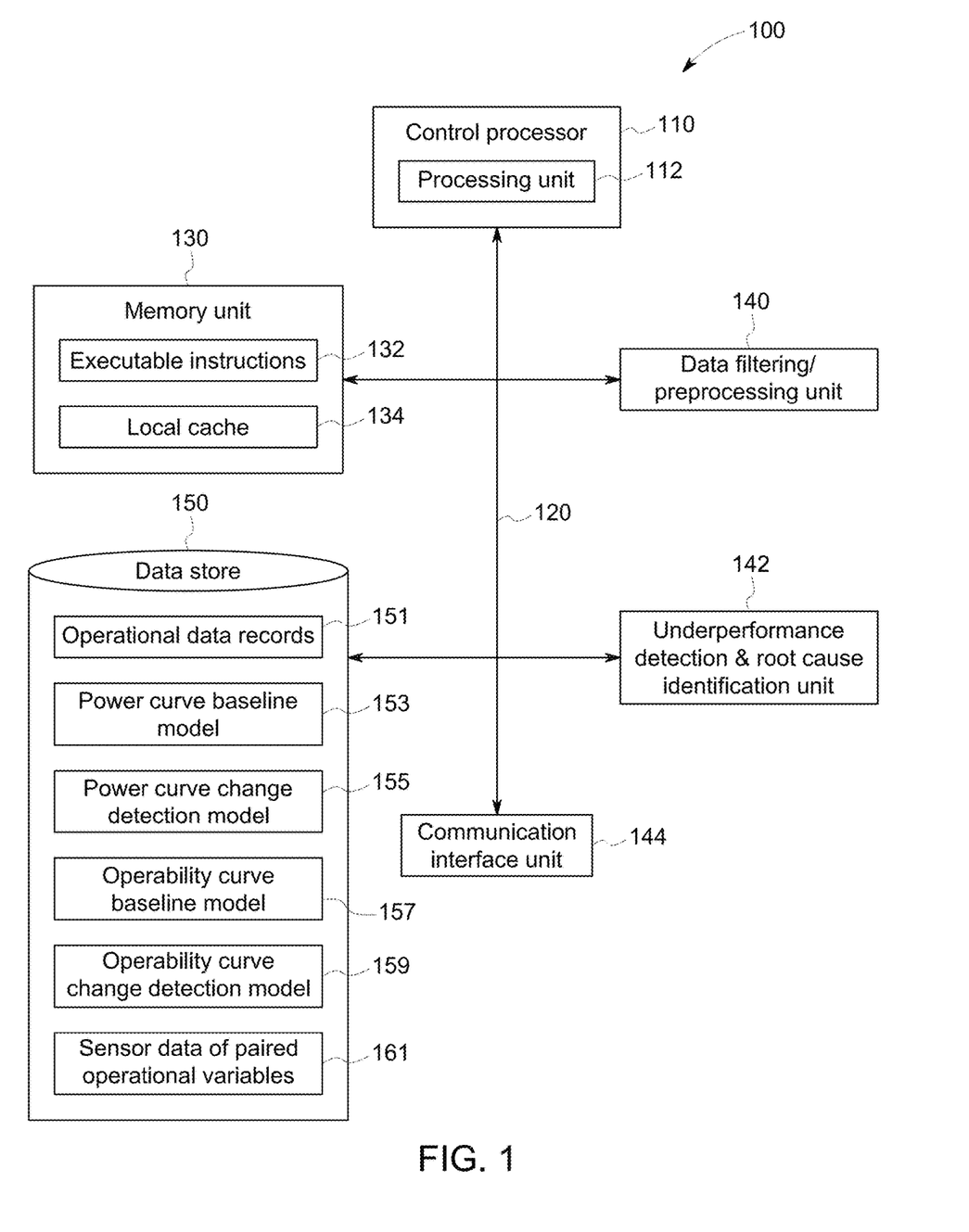
FIG. 1 depicts a system for turbine underperformance detection and root cause identification in accordance with embodiments.

FIG. 1 depicts system 100 to detect turbine underperformance and identify root cause(s) contributing to the underperformance in accordance with embodiments. System 100 can be incorporated within an individual turbine, implemented locally at a wind turbine farm, or at a remote server. System 100 can include control processor 110 (having a processor unit 112) that communicates with other components of the system across data/control bus 120. The system can communicate with remote servers and other devices across an electronic communication network via communication interface unit 144.

Control processor 110 can access executable program instructions 132, which cause the processor to perform embodying operations. The executable instructions can be stored in memory unit 130, or in data store 150. Memory unit 130 can provide the control processor with local cache memory 134.

Data filtering/preprocessing unit 140 receives sensor/monitor data containing information on the turbine operational status (rotation, blade pitch, energy output, etc.) and ambient environmental conditions (wind speed, wind direction, air density, temperature, humidity, etc.). This operational status and environmental condition data is correlated with a time stamp representing data points' time of acquisition. In accordance with embodiments, detection of underproduction due to turbine performance uses the full-load turbine operational data. The data filtering/preprocessing unit excludes data representing periods of turbine downtime and curtailments. Data processing is performed to ensure data quality and data validity, such as the air density correction for wind speed measurements. The resulting data is stored in operational data records 151.

Power production curve baseline model 153 predicts the turbine's expected power production at different wind speeds and other environmental conditions. To reduce the impact introduced by extreme outliers and generate a reliable power curve estimate, the baseline power curve model can include a robust smoothing technique 13 for example, residual error, or regression analysis calculation.

Power curve change detection model 155 quantifies the difference between measured power (contained within operational data records 151) and the corresponding baseline power estimation (from the power curve baseline model 153) at the same wind speed. Given no change, the power residual time series would follow a common distribution across the detection period. This power curve change detection model identifies changes in the power residual time series. A detected change could correspond to potential power underproduction. The detection model can implement a statistical method that identifies times when a time series changes significantly in terms of a specific metric (e.g., mean, variance, etc.). This metric can be predetermined by a user based on site conditions, production requirements, and other factors.

Operability curve baseline model 157 describes the relationship within one or more pairs of paired turbine operational variables (for example, generator torque vs. generator speed; blade pitch angle vs. wind speed; blade pitch angle vs. power; etc.). For each type of operability curve, a robust baseline model is provided to represent the normal turbine operation pattern.

Operability curve change detection model 159 defines a vertical residual for any specific type of operability baseline curve. This vertical residual can be the difference between the actual value on the y-axis and the associated baseline estimation corresponding to the same value on the x-axis. Operability curve change detection model identifies significant changes (based on a predetermined metric) in the residual time series, and any detected change could correspond to potential abnormal turbine operation.

The baseline models can implement robust regression technique(s) to accurately capture the baseline turbine performance, and a change point detection algorithm can be used to identify the most significant changes for the deviation from baseline.

Underperformance detection & root cause identification unit 142 (herein "identification unit") monitors output from the power curve change detection model. If this monitored power curve change exceeds a predetermined metric (threshold, and/or magnitude), the identification unit analyzes one or more of the paired turbine operational variables from the operability curve change detection model to identify the root cause of the power curve change. In some implementations, the power curve change detection model can compare the power curve change to the predetermined metric and signal the identification unit of the out of tolerance condition.

Figure 2:
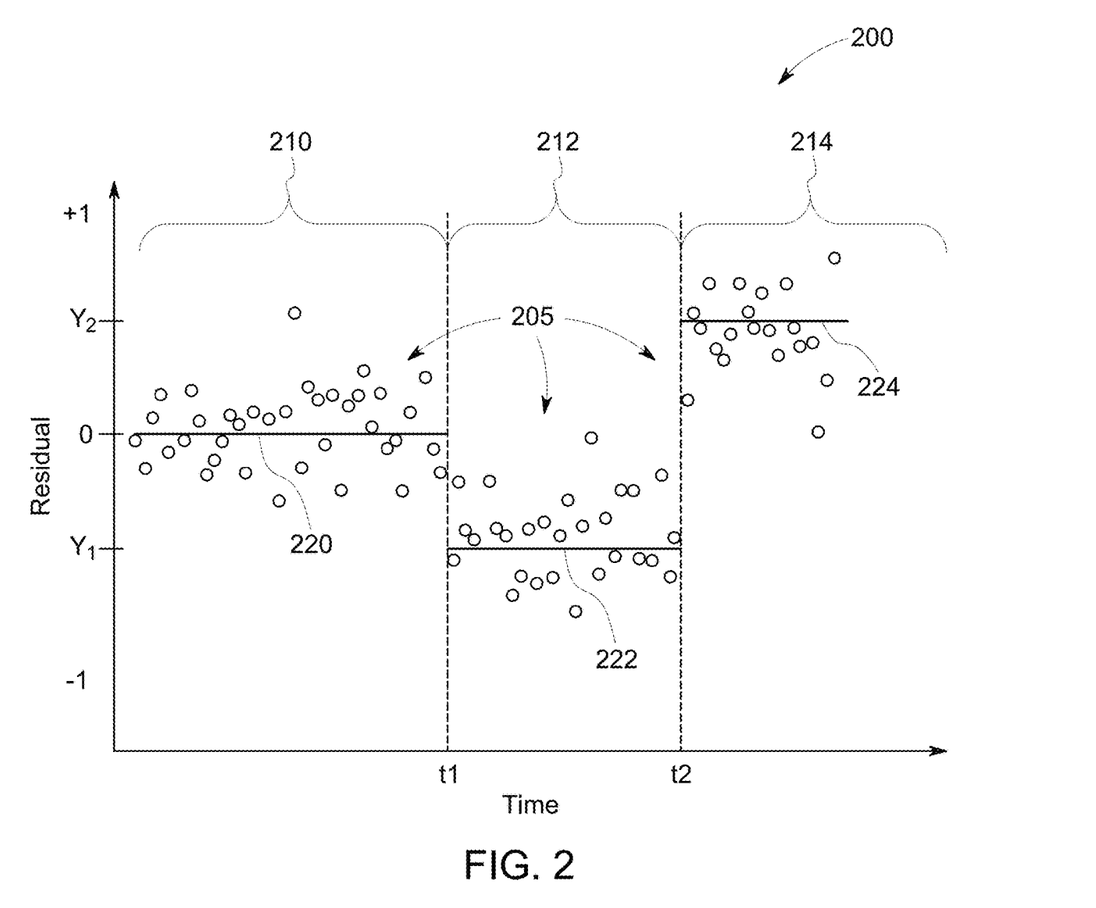
FIG. 2 graphically depicts a representation of a time series data plot over time.

By way of example, FIG. 2 graphically depicts time series data plot 200 of multiple data points 205. Data plot region 210 precedes time $t_1$, and contains data points having a data point mean 220 of about zero. Data plot region 212 extends between time $t_1$-$t_2$, and contains data points having a data point mean 222 with a magnitude of about $Y_1$. Data plot region 214 extends after time $t_2$, and contains data points having a data point mean 224 with a magnitude of about $Y_2$. Time series data plot 200 can be representative of the residual time series data produced by comparing the measured operability curve to the operability curve baseline model 157 for one of the paired turbine operational variables.

In accordance with embodiments, identification unit 142 can evaluate the residuals for one or more time periods of a time series data plot (e.g., plot 200). The evaluation can be a comparison of the residuals' magnitude(s) to predetermined metrics. Based on the result of the evaluation, the identification unit can determine if the paired turbine operation variable producing the particular data is a root cause of a change in the production power curve for the turbine.

Embodying systems and methods provide automatic detection of turbine underperformance and operation anomalies. Embodying methods can be simultaneously applied to real-time turbine operational data for one or more turbines of a wind farm, and/or at a fleet level, which facilitates development of improved asset performance management strategy. The improved strategy can increase power productivity. Also, the ability to identify root causes enables more efficient maintenance planning and a reduction energy production loss.

In some implementations, user-defined baseline performance models can be used, such as using user-specified engineering power curve in the power curve detection model. Furthermore, the method can be applied to a variety of turbine operating conditions and/or parameters (low or high wind speeds, specified humidity ranges, atmospheric particulate suspension, etc.) to detect condition-specific root causes. In some implementations, these user-specified conditions and/or parameters can be used during design specification development to be predictive of expected production capabilities for a turbine, a windfarm, and/or fleet operations.

Figure 3:
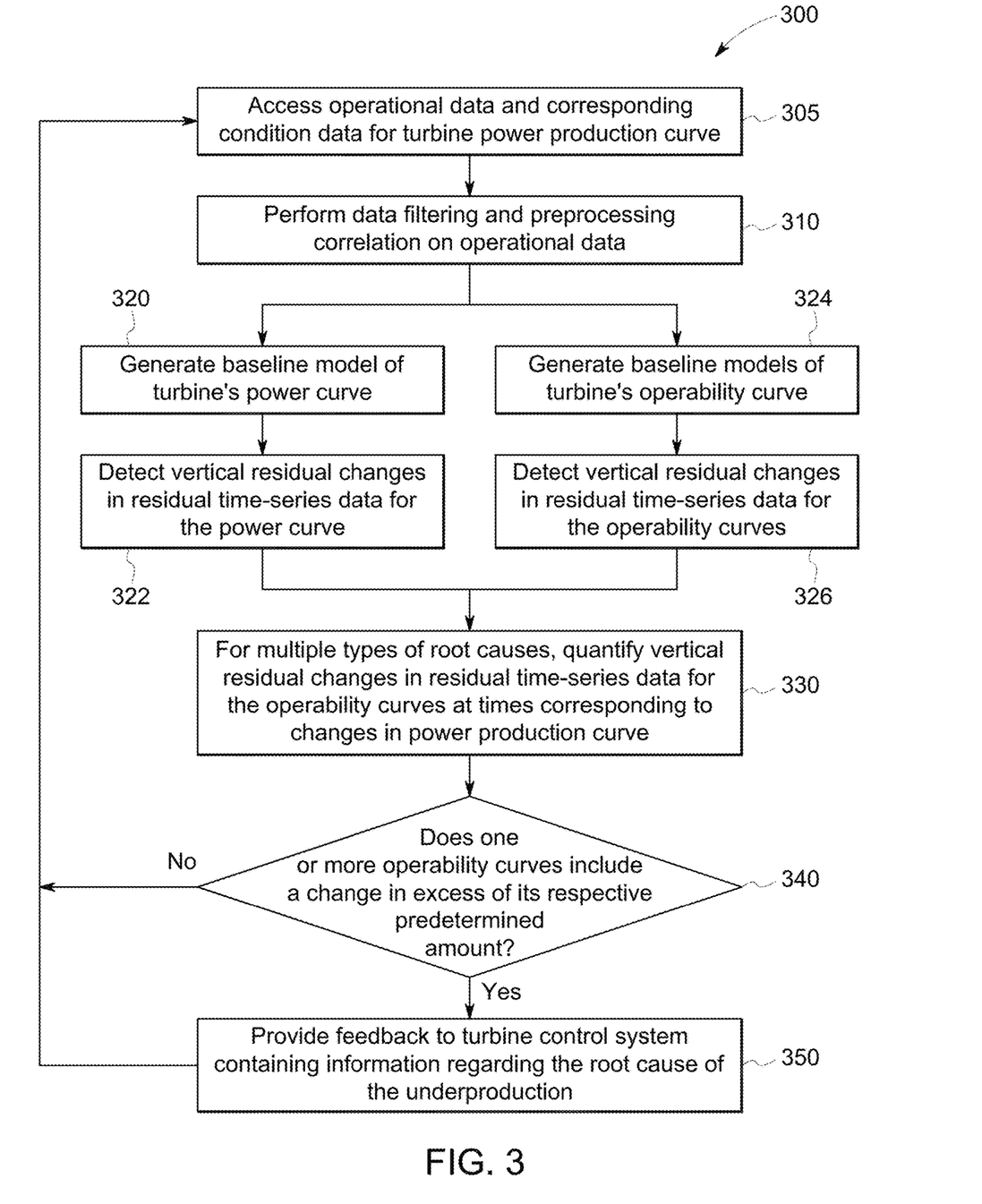
FIG. 3 depicts a process for identifying root causes of turbine underperformance in accordance with embodiments.

FIG. 3 depicts process 300 for identifying root causes of turbine underperformance in accordance with embodiments. Operational data containing information on the turbine operational status (rotation, blade pitch, energy output, etc.) and ambient environmental conditions (wind speed, wind direction, air density, temperature, humidity, etc.) for a turbine is accessed, step 305. This operational data is acquired in real time (i.e., during turbine operation) by sensors and monitors.

At step 310, data filtering of the turbine output power readings removes data representing periods of turbine downtime and curtailments. Data preprocessing correlates environmental conditions with the same time stamp as the output power reading data. The resulting filtered and processed data is stored in operational data records 151.

A baseline model of the turbine's power curve is generated, step 320. The baseline model represents the expected power production curve for the turbine at a variety of wind speeds and other conditions. The expected power production can be based on manufacturer's specifications, which can be supplemented with historic (individualized or fleet level) measured data for the turbine.

Figure 4A:
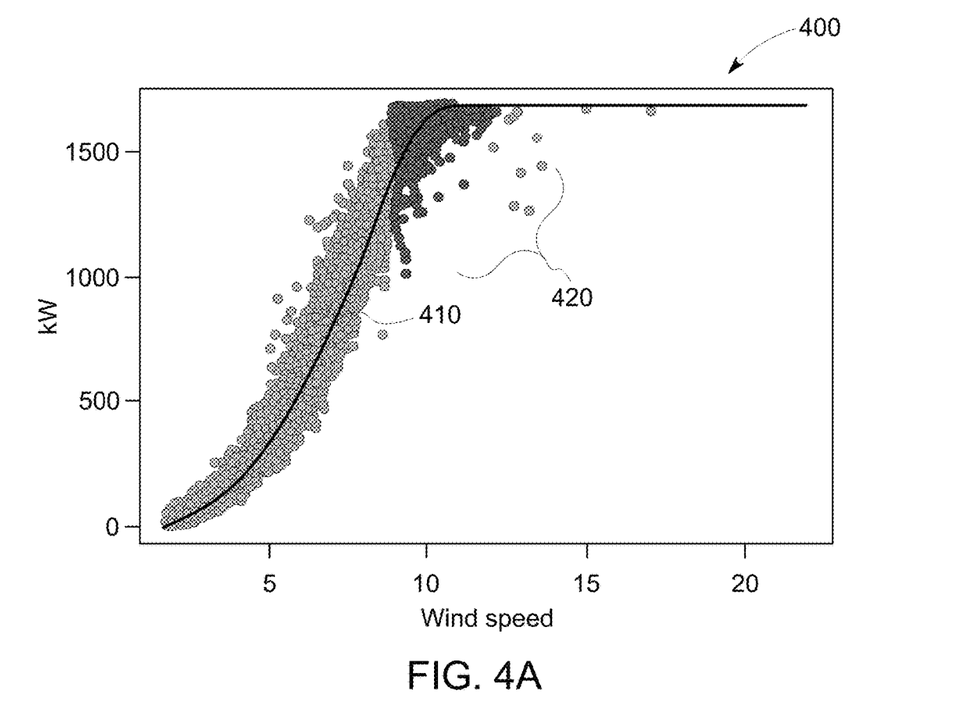
FIG. 4A graphically depicts turbine operational performance data for the power curve in accordance with embodiments.

FIG. 4A graphically depicts turbine operational performance data 400 in accordance with embodiments. This performance data is the turbine output power (over time) for multiple wind speeds that were recorded contemporaneously with the sensed output power. Baseline curve 410 represents the expected output power versus wind speed. Many data samples of the power output within region 420 do not increase with increasing wind speed. This stagnation of power output can be indicative of underproduction.

Changes between the turbine's power production curve (e.g., from operational data records 151) and the turbine's power production curve baseline model are detected, step 322. The changes can be identified by examining a power residual time series, where a negative change could correspond to potential power underproduction.

Figure 4B:
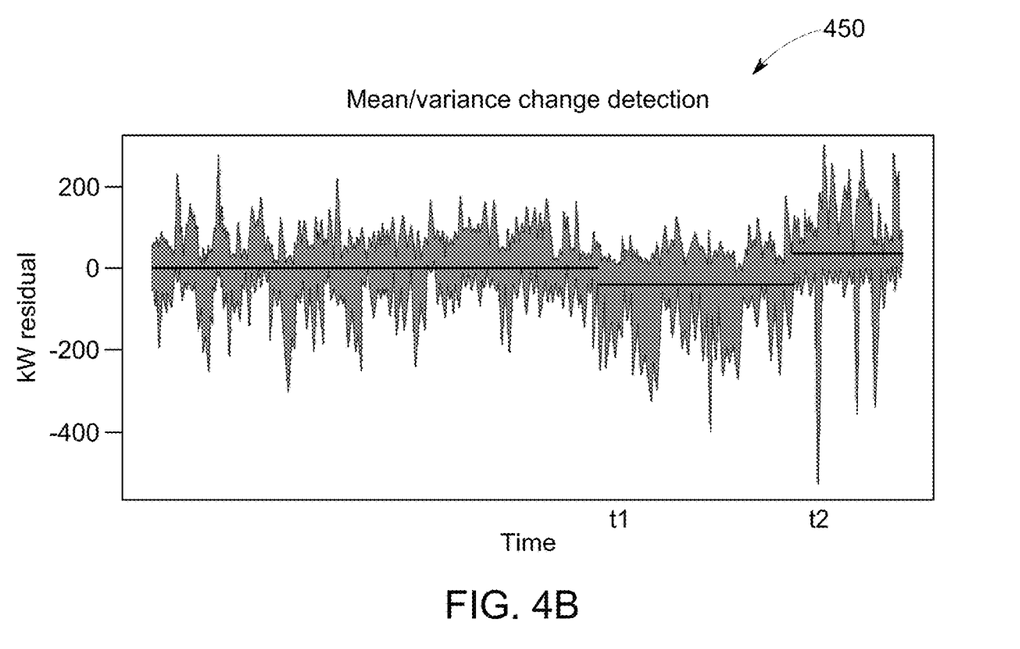
FIG. 4B graphically depicts a time series representation of the performance data of FIG. 4A FIG. 5A graphically depicts operational performance data for an underlying contributor to the operational performance data of FIG. 4A in accordance with embodiments.

FIG. 4B graphically depicts time series representation 450 of the performance data of FIG. 4A. Prior to $t_1$, the time series data has about a zero mean residual, which indicates that the turbine's measured power production curve matches its baseline power production curve model. Between time $t_1$-$t_2$, the time series data has a negative mean residual. Subsequent to time $t_2$, the residual has a positive bias.

One or more baseline models of the turbine's operability curves are generated, step 324. These baseline model operability curve(s) represents relationship within one or more pairs of paired turbine operational variables (for example, generator torque vs. generator speed; blade pitch angle vs. wind speed; blade pitch angle vs. power; etc.) These operability curves can be based on manufacturer's specifications, which can be supplemented with historic (individualized or fleet level) data for the turbine.

Figure 5A:
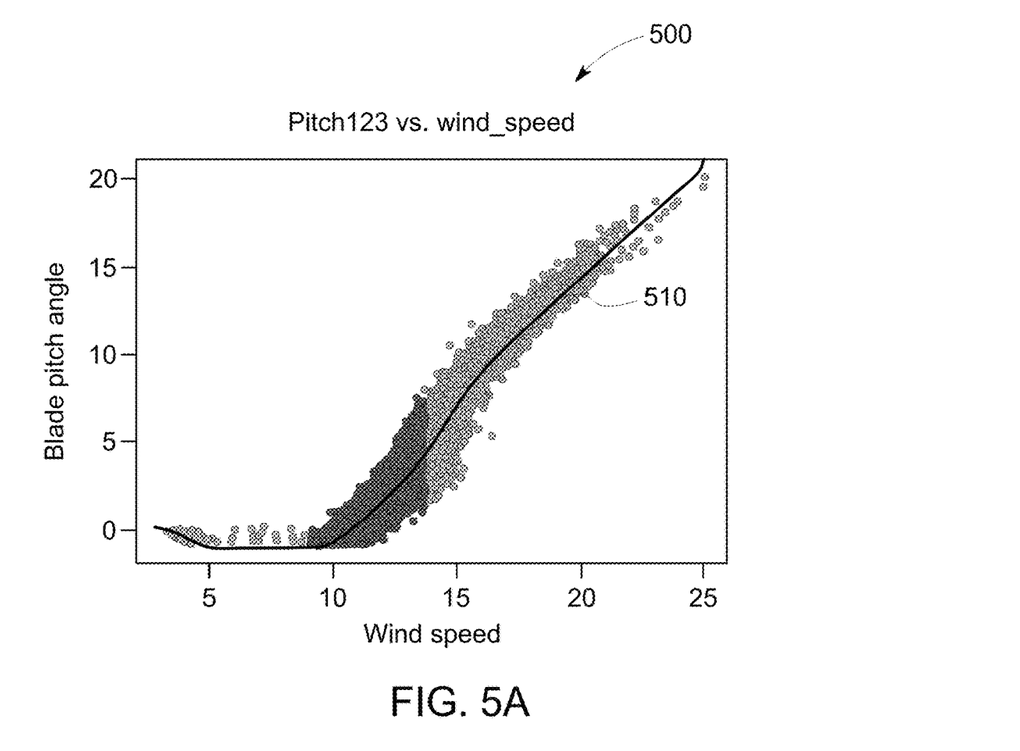

By way of example, FIG. 5A graphically depicts in accordance with embodiments operational performance data 500 for the paired operational variables blade pitch angle vs. wind speed, which can be an underlying contributor to the operational performance data of FIG. 4A. Curve 510 represents the baseline operability curve generated at step 324 for this pair of variables.

Figure 6A:
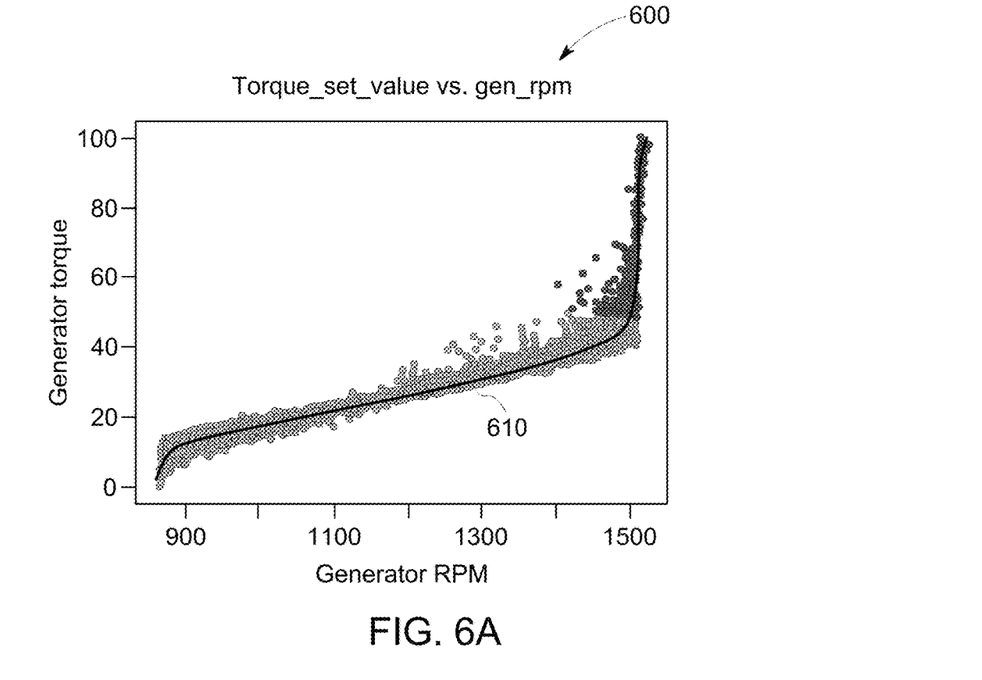

FIG. 6A graphically depicts in accordance with embodiments operational performance data 600 for the paired operational variables generator torque vs. generator speed, which can be an underlying contributor to the operational performance data of FIG. 4A. Curve 610 represents the baseline operability curve generated at step 324 for this pair of variables.

Vertical residual changes in residual time-series data between the operability curve baseline models and the turbine's actual operability curves are detected, step 326. The actual operability curves can be generated from time-stamped paired operational variable sensor data 161 for the various parameter pairs of the turbine's paired operational variables—generator torque vs. generator speed; blade pitch angle vs. wind speed; blade pitch angle vs. power; etc. The magnitude of a detected change (based on a predetermined metric) in the residual time series could correspond to potential abnormal turbine operation.

Figure 5B:
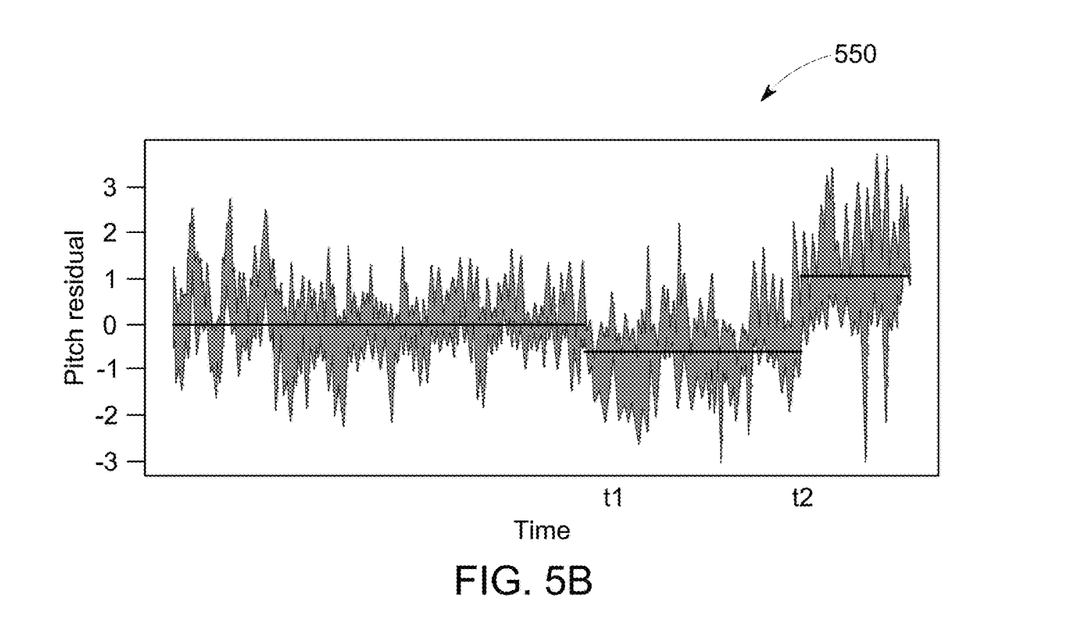
FIG. 5B graphically depicts a time series representation of the performance data of FIG. 5A FIG. 6A graphically depicts operational performance data for an underlying contributor to the operational performance data of FIG. 4A in accordance with embodiments.

By way of example, FIG. 5B graphically depicts a time series representation 550 of the operational performance data of FIG. 5A. Prior to $t_1$, the time series data has about a zero mean residual, which indicates that these paired variables measured operation matches their baseline operability curve. Between time $t_1$-$t_2$, the time series data has a negative mean residual. Subsequent to time $t_2$, the residual has a positive bias.

Figure 6B:
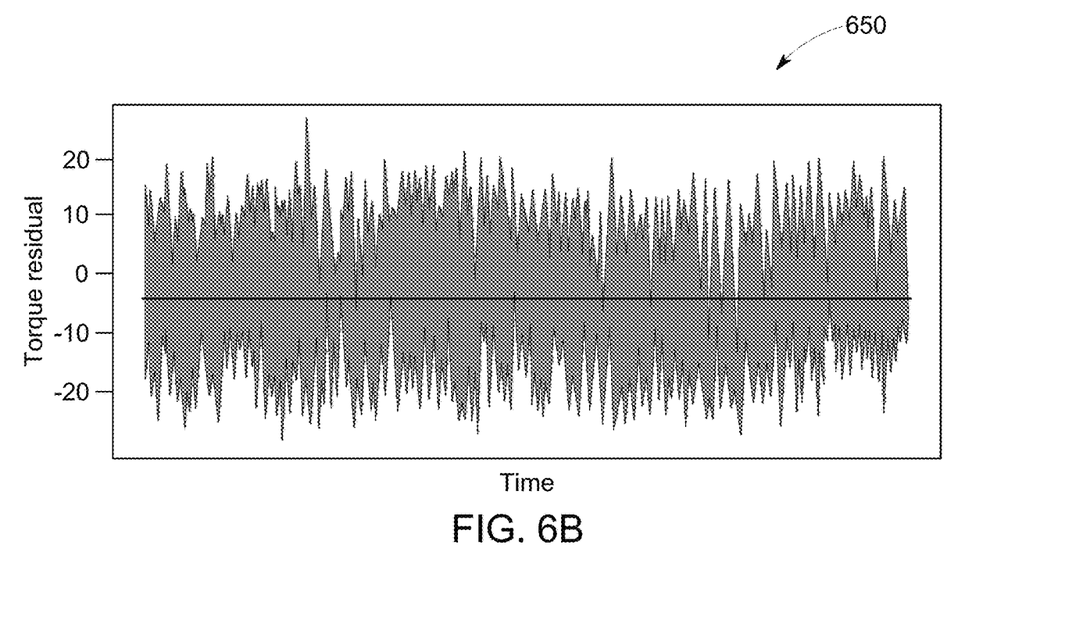
FIG. 6B graphically depicts a time series representation of the performance data of FIG. 6A.

FIG. 6B graphically depicts a time series representation 650 of the performance data of FIG. 6A. The time series data has about a zero mean residual across the monitored time, which indicates that these paired variables measured operation matches their baseline operability curve.

For one or more types of root causes, the vertical mean residual changes in residual time-series data for the operability curves at times corresponding to changes in power production curve is quantified by comparison to a predetermined metric, step 330.

A determination is made, step 340, as to whether one or more operability curves include change in excess of its respective predetermined amount. If the change is less than the predetermined metric, process 300 returns to step 305. If the change is in excess of its predetermined metric, feedback information regarding the root cause of underproduction is provided to the turbine control system, step 350. The turbine control system can then adjust one or more turbine actuators to impact a value for a respective one of the operational variables to increase the power production. Process 300 can then return to step 305 for continued underperformance detection and root cause identification.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable program instructions that when executed may instruct and/or cause a controller or processor to perform methods discussed herein such as a method of detecting turbine underproduction and identifying root cause(s), as disclosed above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A method of correcting turbine underperformance, the method comprising:
    accessing monitored operational data for the turbine;
    calculating a power production curve using at least a portion of the monitored operational data;
    predicting a baseline power production curve based on expected performance of the turbine;
    detecting a first set of changes between at least the portion of the monitored operational data and the baseline power production curve;
    generating one or more monitored operability curves from the at least a portion of the monitored operational data, each of the one or more monitored operability curves describing a relationship between monitored values for paired operational variables;
    generating one or more baseline operability curves for the turbine, each of the one or more baseline operability curves describing an expected relationship between the paired operational variables;
    detecting a set of changes between the one or more monitored operability curves and a corresponding one of the one or more baseline operability curves;
    comparing one or more of the set of changes to a respective predetermined metric for each of the paired operational variables; and
    based on a determination that one or more members of the set of changes is in excess of the respective predetermined metric, providing feedback to a turbine control system identifying at least one of the paired operational variables that corresponds to the member of the set of changes in excess of the predetermined metric.

2. The method of claim 1, including preconditioning the portion of the monitored operational data to exclude at least one of data representing periods of at least one of turbine downtime and turbine curtailment.

3. The method of claim 1, including in the baseline power production curve one or more elements of historic measured data for the turbine.

4. The method of claim 1, including applying smoothing techniques to the expected baseline power production curve.

5. The method of claim 1, including generating a time series plot of power residuals prior to detecting the set of changes.

6. The method of claim 5, including applying a change point detection algorithm to detect the set of changes.

7. The method of claim 1, including at least one member of the paired operational variables identified to the turbine control system having a value controllable by the turbine control system.

8. A non-transitory computer-readable medium having stored thereon instructions which when executed by a control processor cause the control processor to perform a method of correcting turbine underperformance, the method comprising:
    accessing monitored operational data for the turbine;
    calculating a power production curve using at least a portion of the monitored operational data;
    predicting a baseline power production curve based on expected performance of the turbine;
    detecting a first set of changes between at least the portion of the monitored operational data and the baseline power production curve;
    generating one or more monitored operability curves from the at least a portion of the monitored operational data, each of the one or more monitored operability curves describing a relationship between monitored values for paired operational variables;
    generating one or more baseline operability curves for the turbine, each of the one or more baseline operability curves describing an expected relationship between the paired operational variables;
    detecting a set of changes between the one or more monitored operability curves and a corresponding one of the one or more baseline operability curves;

comparing one or more of the set of changes to a respective predetermined metric for each of the paired operational variables; and based on a determination that one or more members of the set of changes is in excess of the respective predetermined metric, providing feedback to the turbine control system identifying at least one of the paired operational variables that corresponds to the member of the set of changes in excess of the predetermined metric.

9. The non-transitory computer-readable medium of claim 8, the instructions further configured to cause the control processor to perform the method by including preconditioning the portion of the monitored operational data to exclude at least one of data representing periods of at least one of turbine downtime and turbine curtailment.

10. The non-transitory computer-readable medium of claim 8, the instructions further configured to cause the control processor to perform the method by including in the baseline power production curve one or more elements of historic measured data for the turbine.

11. The non-transitory computer-readable medium of claim 8, the instructions further configured to cause the control processor to perform the method by including applying smoothing techniques to the expected baseline power production curve.

12. The non-transitory computer-readable medium of claim 8, the instructions further configured to cause the control processor to perform the method by including generating a time series plot of power residuals prior to detecting the set of changes.

13. The non-transitory computer-readable medium of claim 12, the instructions further configured to cause the control processor to perform the method by including applying a change point detection algorithm to detect the set of changes.

14. The non-transitory computer-readable medium of claim 8, the instructions further configured to cause the control processor to perform the method by including at least one member of the paired operational variables identified to the turbine control system having a value controllable by the turbine control system.

15. A turbine control system for correcting turbine underperformance, the system comprising:
a turbine having a control processor in communication with a memory unit and a data store;
the control processor including a processing unit, the control processor in communication with one or more turbine actuators;
the memory unit including non-transitory computer-readable executable instructions which when executed by the control processor cause the control processor to perform a method of correcting turbine underperformance, the method comprising:
accessing monitored operational data for the turbine;
calculating a power production curve using at least a portion of the monitored operational data;
predicting a baseline power production curve based on expected performance of the turbine;
detecting a first set of changes between at least the portion of the monitored operational data and the baseline power production curve;
generating one or more monitored operability curves from the at least a portion of the monitored operational data, each of the one or more monitored operability curves describing a relationship between monitored values for paired operational variables;
generating one or more baseline operability curves for the turbine, each of the one or more baseline operability curves describing an expected relationship between the paired operational variables;
detecting a set of changes between the one or more monitored operability curves and a corresponding one of the one or more baseline operability curves;
comparing one or more of the set of changes to a respective predetermined metric for each of the paired operational variables; and
based on a determination that one or more members of the set of changes is in excess of the respective predetermined metric, providing feedback to control one or more turbine actuators that impact a value for at least one of the paired operational variables that corresponds to the member of the set of changes in excess of the predetermined metric.

16. The system of claim 15, the instructions further configured to cause the control processor to perform the method by including preconditioning the portion of the monitored operational data to exclude at least one of data representing periods of at least one of turbine downtime and turbine curtailment.

17. The system of claim 15, the instructions further configured to cause the control processor to perform the method by including in the baseline power production curve one or more elements of historic measured data for the turbine.

18. The system of claim 15, the instructions further configured to cause the control processor to perform the method by including applying smoothing techniques to the expected baseline power production curve.

19. The system of claim 15, the instructions further configured to cause the control processor to perform the method by including:
generating a time series plot of power residuals prior to detecting the set of changes; and
applying a change point detection algorithm to detect the set of changes.

20. The system of claim 15, the instructions further configured to cause the control processor to perform the method by including at least one member of the paired operational variables identified to the turbine control system having a value controllable by the turbine control system.

* * * * *